(12) United States Patent
Ni et al.

(10) Patent No.: US 11,379,004 B2
(45) Date of Patent: Jul. 5, 2022

(54) ADJUSTMENT CONTROL MECHANISMS OF POGO PINS

(71) Applicant: Hewlett-Packard Development Company, L.P., Houston, TX (US)

(72) Inventors: Jerry Ni, Taipei (TW); Ray Chiang, Taipei (TW); David Ho, Taipei (TW); Harris Tsai, Taipei (TW); Leo Lee, Taipei (TW); Yi Chieh Chang, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 1002 days.

(21) Appl. No.: 16/058,039

(22) Filed: Aug. 8, 2018

(65) Prior Publication Data

US 2020/0050239 A1 Feb. 13, 2020

(51) Int. Cl.
*H01R 12/00* (2006.01)
*G06F 1/16* (2006.01)
*H01R 33/76* (2006.01)
*H01R 33/945* (2006.01)
*H01R 13/20* (2006.01)
*H01R 33/97* (2006.01)
(Continued)

(52) U.S. Cl.
CPC ......... *G06F 1/1632* (2013.01); *H01R 12/714* (2013.01); *H01R 13/20* (2013.01); *H01R 13/24* (2013.01); *H01R 33/7685* (2013.01); *H01R 33/945* (2013.01); *H01R 33/97* (2013.01)

(58) Field of Classification Search
CPC .... H01R 2103/00; H01R 24/50; H01R 24/40; H01R 9/0518; H01R 13/625; H01R 23/725; H01R 12/585; H05K 3/368
See application file for complete search history.

(56) References Cited

U.S. PATENT DOCUMENTS 4,661,709 A * 4/1987 Walker .................. B82Y 40/00
313/325
4,837,622 A * 6/1989 Whann .............. G01R 1/07378
324/72.5
(Continued)

FOREIGN PATENT DOCUMENTS

JP 2017510181 A 4/2017
TW I354794 12/2011
(Continued)

*Primary Examiner* — Phuong Chi Thi Nguyen
(74) *Attorney, Agent, or Firm* — Brooks Cameron & Huebsch PLLC

(57) ABSTRACT

An example device can include a mounting device having a first connector bracket fixedly positioned on the mounting device, a plurality of pogo pins positioned within the first connector bracket, and an adjustment control mechanism positioned about at least one pogo pin of the plurality of pogo pins. A computing device has a second connector bracket fixedly positioned on the computing device, the second connector bracket forming a plurality of openings for receiving the plurality of pogo pins, wherein the adjustment control mechanism is to fixedly position the plurality of pogo pins within the plurality of openings to maintain electrical connection of the first connector bracket and the second connector bracket during adjustment of the computing device relative to the mounting device.

9 Claims, 9 Drawing Sheets

(51) Int. Cl.
*H01R 13/24* (2006.01)
*H01R 12/71* (2011.01)

(56) References Cited

U.S. PATENT DOCUMENTS

| | | | |
|---|---|---|---|
| 5,742,169 A * | 4/1998 | Akram | G01R 35/02 324/755.05 |
| 6,878,016 B2 | 4/2005 | Wulff et al. | |
| 7,611,389 B2 | 11/2009 | Toivanen et al. | |
| 9,558,482 B2 | 1/2017 | Hicks et al. | |
| 9,823,702 B2 | 11/2017 | Zhang et al. | |
| 2011/0104959 A1 * | 5/2011 | Asai | H01R 13/2421 439/823 |
| 2014/0115891 A1 * | 5/2014 | Hsu | C25D 5/48 29/874 |
| 2016/0105047 A1 | 4/2016 | Cui | |
| 2017/0258354 A1 | 9/2017 | Jovanovic et al. | |

FOREIGN PATENT DOCUMENTS

| | | |
|---|---|---|
| TW | I374369 | 10/2012 |
| TW | I629582 | 7/2018 |
| WO | WO-2017152959 A1 | 9/2017 |

\* cited by examiner

ADJUSTMENT CONTROL MECHANISMS OF POGO PINS

BACKGROUND

Universal Serial Bus (USB) Type-C is a multi-pin USB connector system. A USB Type-C connector can connect to a host and/or a device and can allow for power delivery, signal delivery, and other communication delivery. Such deliveries can be bi-directional.

DETAILED DESCRIPTION

Figure 1:
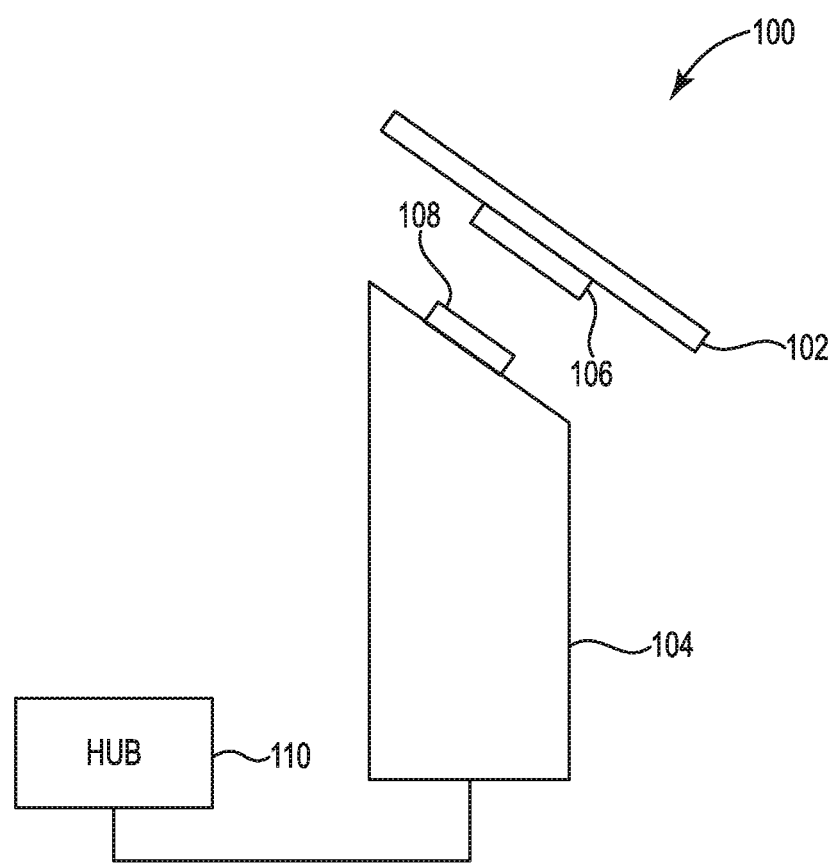
FIG. 1 illustrates a diagram of a system including a computing device, a mounting device, and a hub according to an example.

A docking station or "dock" provides a simplified way of connecting an electronic device such as the tablet or laptop computer to peripherals. Because a wide range of dockable devices—from mobile telephones to wireless mice—have different connectors, power signaling, and uses, docks may not be standardized. Some dock examples can allow for portable computing devices to dock and undock hot, cold, or standby. In a cold dock or undock, the computing device is shut down before docking/undocking. In a hot dock or undock, the computing device remains running when docked/undocked. Standby docking or undocking allows the computing device to be docked/undocked while in a sleep mode.

USB Type-C connectors are used for high-speed input/output (I/O) and power delivery. For instance, USB Type-C connectors are used in smartphones technologies and computing technologies (e.g., personal computers (PCs)). USB Type-C connectors utilize precise alignment and accurate push force to yield solid contacts without damage to a USB Type-C connector. This can affect reliability of the USB Type-C. The use of USB Type-C connectors for docking can create alignment, push force, and tolerance concerns for these reasons. In addition, USB Type-C connectors may cause challenges when docking at angles because of its vertical mount configuration and lack of support for docking without additional mechanical parts.

Examples of the present disclosure provide for docking using pogo pins that simulate behavior of a USB Type-C. As used herein, a pogo pin is a device used in electronics to establish a connection between two printed circuit boards (PCBs). Pressed between two electronic circuits, points at each end of the pogo pin can make contacts with two electronic circuits, connecting the two electronic circuits together. Some examples can include docking a computing device such as a tablet to a mounting device via pogo pins. Signals, power, and other communication can be between the computing device and a hub. The pogo pin connection can follow a USB Type-C connector protocol in some instances.

In some examples, pogo pins can allow for docking the computing device at different angles, as opposed to flat orientations, which can be desired in point-of-sale environments. In addition, the computing device can be resiliently connected to the mounting device to allow for docking and undocking of the computing device. Magnetic connections may be used in some instances to aid in docking of the computing device to the mounting device.

Degradation or loss of electrical connection between the computing device and the mounting device may result from repeated movement of the computing device relative to the mounting device by a user. In some examples, at least one of the pogo pins includes an adjustment control mechanism with advancement pins positioned within advancement channels located along the pogo pin. As the computing device is positioned on the mounting device in an insertion position, the pogo pins of the mounting device are fully inserted within openings of the computing device so that engagement (docking) of the computing device and mounting device is achieved.

The advancement pins are capable of slideably moving between ends of the respective advancement channel. Therefore, as a user tilts the computing device from the insertion position to a fully tilted position, the advancement pins advance along the advancement channels toward corresponding second channel ends so that once the computing device is advanced to the fully tilted position, the advancement pins engage against second channel ends, preventing further advancement of the advancement pins within the advancement channels. As a result, the adjustment control mechanism is in a locked position that prevents the user from over advancing the computing device from the fully tilted position, thereby ensuring connection between the pogo pins and the computing device and preventing degradation or loss of electrical connection resulting from repeated movement.

FIG. 1 illustrates a diagram of a system 100 including a computing device 102, a mounting device 104, and a hub 110 according to an example. System 100 may be used in a retail point-of-sale application in some examples. For instance, system 100 may be used in a retail setting such that a user can dock and undock computing device 102 from mounting device 104 and travel around the retail environment with computing device. For example, a user may show a customer options on computing device 102 while on a sales floor, return to mounting device 104, and dock computing device 102 to mounting device 104 to complete a sale. Computing device 102 can include a computing device that can function and maintain power while docked or undocked from mounting device 104. For instance, computing device has sufficient processing and memory capabilities to function undocked from mounting device 104. An example includes a tablet computing device.

Computing device 102 can have a first portion 106 of a pogo pin connector coupled thereto, and mounting device 104 can have a second portion 108 of the pogo pin connector coupled thereto. Second portion 108 can receive first portion 106 during docking of computing device 102 to mounting device 104. First portion 106 can engage with second portion 108 to simulate a USB Type-C connection. For instance, the engagement can include the use of an enhanced high speed pogo with a USB Type-C connector protocol. This can include the pogo pin connector performing functions analogous to those of a USB Type-C connector including facilitation of high speed communication signals and power signals between computing device 102 and hub 110.

The enhanced high speed pogo can include the pogo pins of the pogo pin connector supporting high speed signals (e.g., up to 10 gigabits per second (Gbps)), as compared to other pogo pin connections with speeds of 400 megabits per second. The pogo pins, which can total 24 pins between first portion 106 and second portion 108 can support USB3.1 Gen 1 (5 Gbps) and display port 1.2 (4.7 Gbps) speeds. The 24 pogo pins can cover CC line, USB2, USB3.1 Gen1, display port 1.2 x2 lane, VBUS, GND, and other peripheral signals. Particular pogo pins with particular functions can be placed strategically so as to reduce cross-talk and interference between high-speed signals communicated across the pogo pins and to maintain signal integrity. The pogo pins, both on first portion 106 and second portion 108 can be formed in a curved shape.

In some examples, mounting device 204 can be communicatively coupled to hub 110, which can receive signals sent from computing device 102. As used herein, "communicatively coupled" can include coupled via various wired and/or wireless connections between devices such that data can be transferred in various directions between the devices. The coupling need not be a direct connection, and in some examples, can be an indirect connection. For instance, the signals can be sent from computing device 102 to hub 110 via the pogo pin connector in response to engagement (e.g., docking) of first portion 106 with second portion 108. Signals can be sent, in some instances, from hub 110 to computing device 102 via the pogo pin connector. The signals sent between computing device 102 and hub 100 can include power and communication signals, for instance.

In some examples, computing device 102 and mounting device 104 can include components to create a magnetic connection between computing device 102 and mounting device 104. For instance, when computing device 102 is near mounting device 104 in preparation for docking, magnetic components can suck computing device 102 (and first portion 106 of the pogo pin connector) to mounting device 104 (and second portion 108 of the pogo pin connector) to automatically adjust and align a docking position of computing device 102. Computing device 102 can be locked in the position, which may be predefined, and pogo pins of first portion 106 and pogo pins of second portion 108 are contacted firmly on both sides. As used herein, "automatically" can include being aligned and/or adjusted with limited or no user input and/or with limited or no prompting. For instance, computing device 102 can be adjusted and aligned in response to a docking process and a proximity of magnetic components, and thus the adjusting and aligning is said to be automatic.

Figure 2:
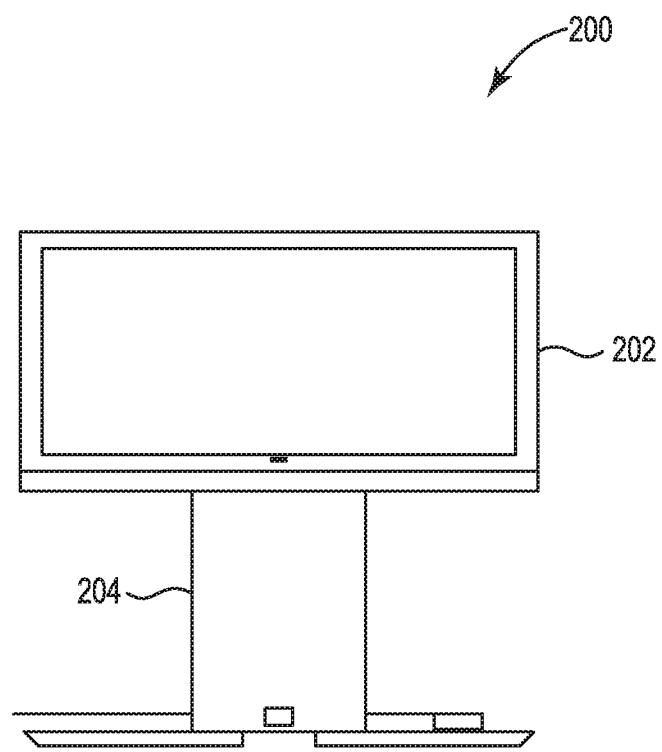
FIG. 2 illustrates a front view of a device including a computing device and a mounting device according to an example.

FIG. 2 illustrates a front view of a device 200 including a computing device 202 and a mounting device 204 according to an example. Device 200 can be analogous to system 100, in some examples. Device 200 can include computing device 202 resiliently coupled to mounting device 204 via the enhanced high speed pogo. The coupling can be resilient, such that the coupling is releasable, removable, detachable, etc. For instance, the coupling of computing device 202 to mounting device 204 may not be a permanent coupling. For example, computing device 202 can undocked from mounting device 204 and used separately from device 200.

Figure 3:
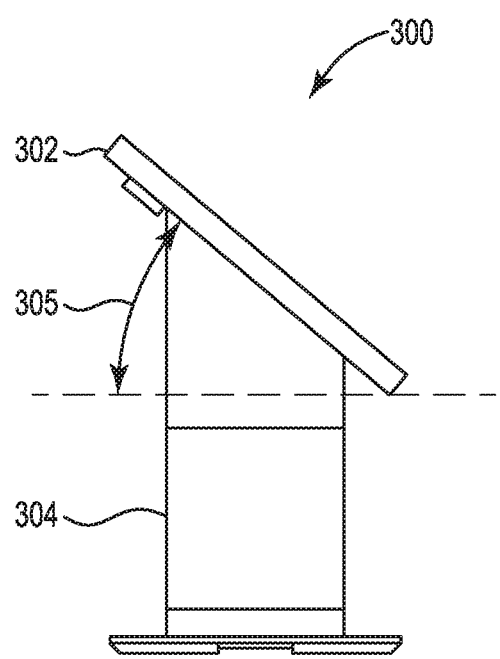
FIG. 3 illustrates a side view of a device including a computing device and a mounting device according to an example.

FIG. 3 illustrates a side view of a device 300 including a computing device 302 and a mounting device 304 according to an example. Device 300 can be analogous to system 100 and/or device 200, in some examples. Device 300 can include computing device 302 resiliently coupled to mounting device 304 via an enhanced high speed pogo. The enhanced high speed pogo can include a first portion of a pogo pin connector (not illustrated in FIG. 3) coupled to computing device 302 and resiliently connected to a second portion of the pogo pin connector. The second portion can be coupled to mounting device 304. In some examples, the USB Type-C connection can allow for power and communication signals (e.g., high-speed communication signals) to be sent from computing device 302 to a hub.

Mounting device 304, in some examples, can be cylindrical, however other shapes are possible. The second portion of the pogo pin connector can be coupled to a face of mounting device 304, which can be angled. This angling results in computing device 302 being angled, for instance as illustrated at 305. The angle can be approximate 45 degrees in some examples but can be a greater or lesser angle. The angle can allow for improved user interaction with computing device 302. For instance, an angled computing device 302 may be easier to see and interact with in a retail point-of-sale environment.

Mounting device 304, in some instance, can be hollow and/or can house components including a printing device. For instance, in an example where device 300 is used in a point-of-sale environment, a receipt printer may be housed inside of mounting device 304. In such an example, a transaction may be completed on computing device 302, and a printing device housed within mounting device 304 may be used to print a receipt for the purchasing customer. In some instances, the printing device can be built into mounting device 304.

Figure 4:
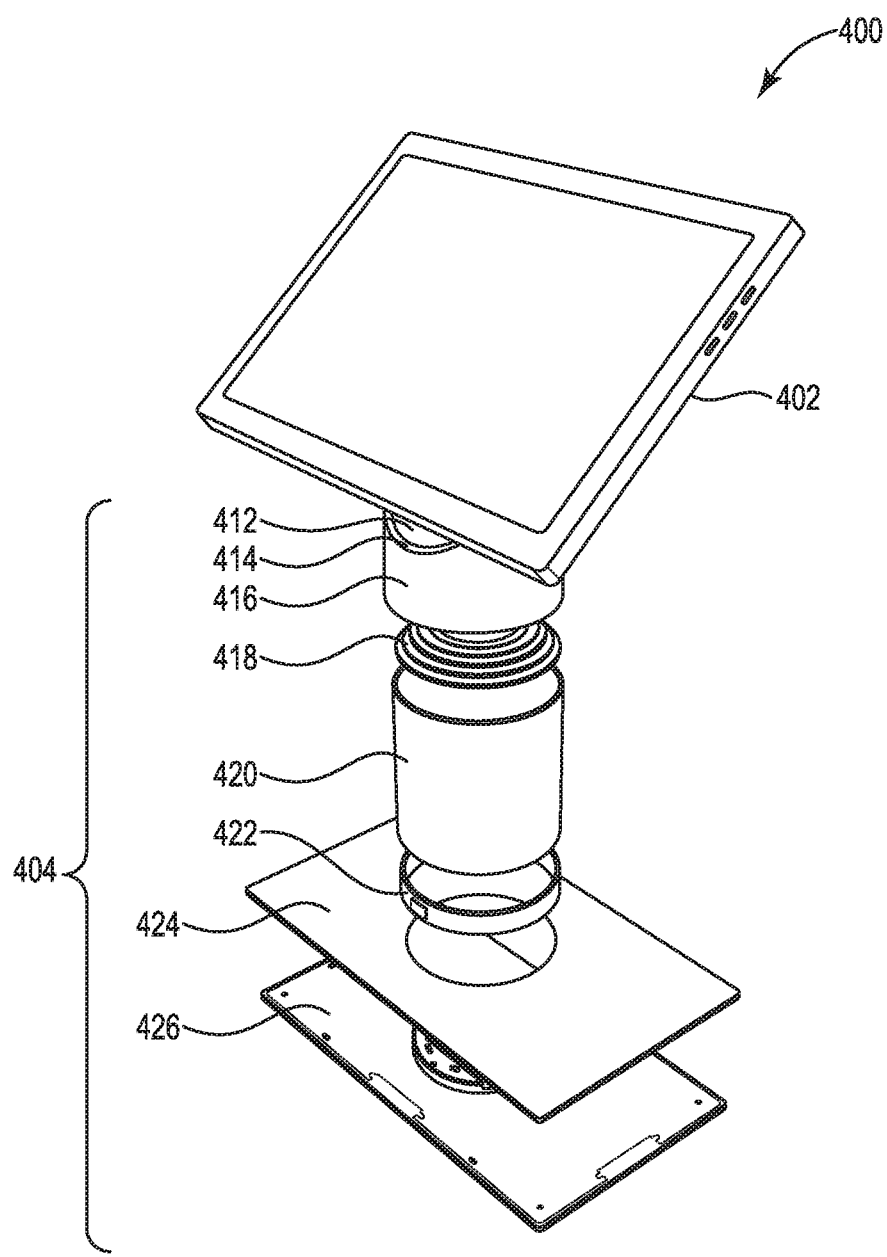
FIG. 4 illustrates an exploded view of a device including a computing device and a mounting device according to an example.

FIG. 4 illustrates an exploded view of a device 400 including a computing device 402 and a mounting device 404 according to an example. Device 400 can be analogous to system 100, device 200, and/or device 300, in some examples. Device 400 can include computing device 402 resiliently coupled to mounting device 404 via an enhanced high speed pogo. In some examples, mounting device 404 can include a plurality of components including plate cover 412 and protective cover 414 on a face of mounting device 404. Plate cover 412 and protective cover 414 can protect portions of a pogo pin connector functioning as the simulated USB Type-C connection.

Mounting device 404 can include upper column 416 having an angled face, and upper column 416 can be connected to lower column 420 via pivot mechanism 418. Pivot mechanism 418 can allow for twisting of upper column 416 (and in turn, computing device 402). For example, a user in a retail point-of-sale environment can turn computing device 402 to show a customer something on a screen of computing device 402. The turn can take place at pivot mechanism 418.

Mounting device 404 can include a bottom puck 422 and a base including top cover 424 and bottom plate 426. Bottom puck 422 can connect lower column 420 to the base, which can be used to hold device 400 upright or attach device 400 to a table or other location. In some examples, bottom puck 422 has a button to electronically control locking and unlocking the mechanism between 402 and 404. In some instances, mounting device 404 can be hollow. Cables for power and/or communication signals sent between computing device 402 and a hub may be housed in mounting device 404. A printing device or other component may be housed in mounting device 404. Mounting device 404, in some instance may not be hollow, but may have routes for passage of cables or other components.

Figure 5:
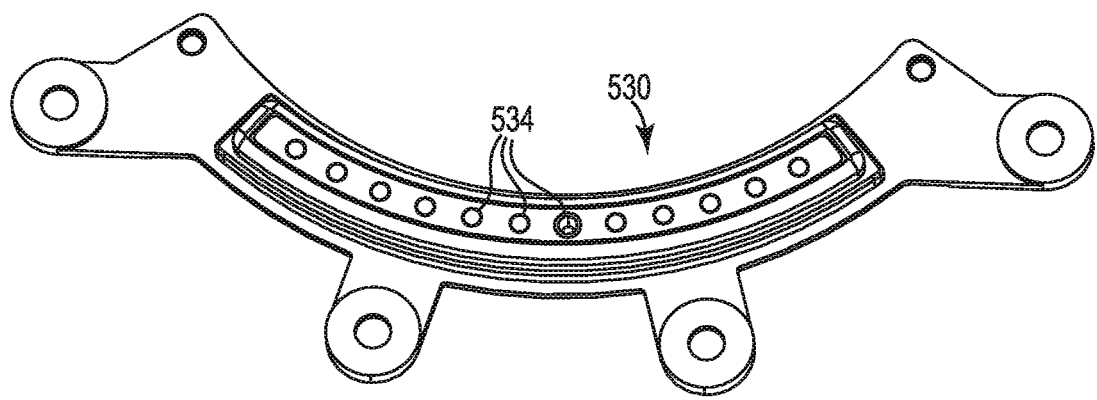
FIG. 5 illustrates a connector bracket that is capable of being positioned on a top portion of a mounting device according to an example.
Figure 6:
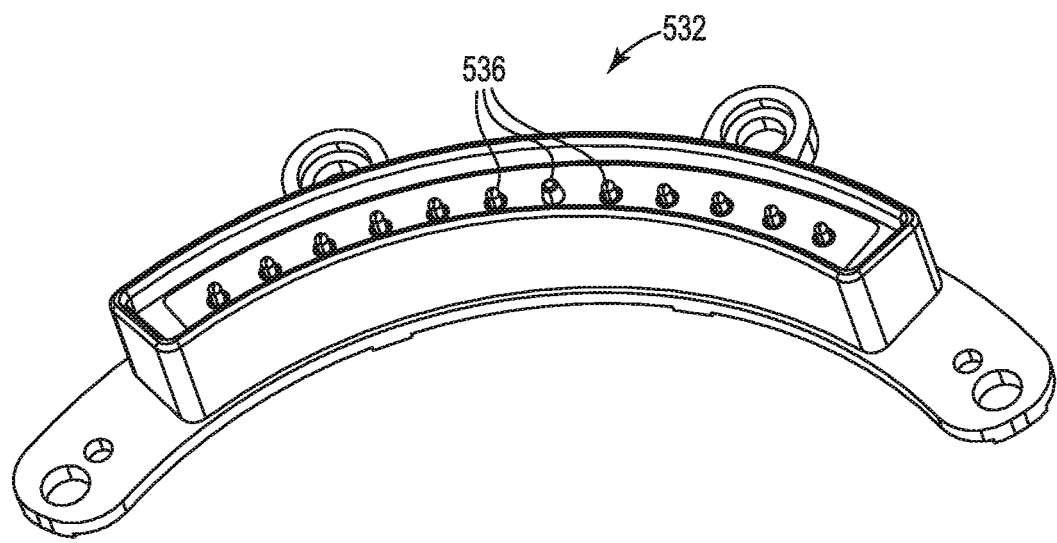
FIG. 6 illustrates a connector that is capable of being positioned on a bottom portion of a computing devices according to an example.

FIG. 5 illustrates a connector bracket 530 that is capable of being positioned on a bottom portion of either of computing devices 102, 202, 302 and 402 according to an example. FIG. 6 illustrates a connector bracket 532 that is capable of being positioned on a top portion of either of mounting devices 104, 204, 304, and 404 according to an example. In one example, connector bracket 530 may form first portion 106 of computing device 102 and connector bracket 532 may form second portion 108 of mounting device 104. Multiple openings 534 are formed along connector bracket 530 for receiving corresponding pogo pins 536 positioned along connector bracket 532 during the coupling of a computing device to a mounting device.

Figure 7A:
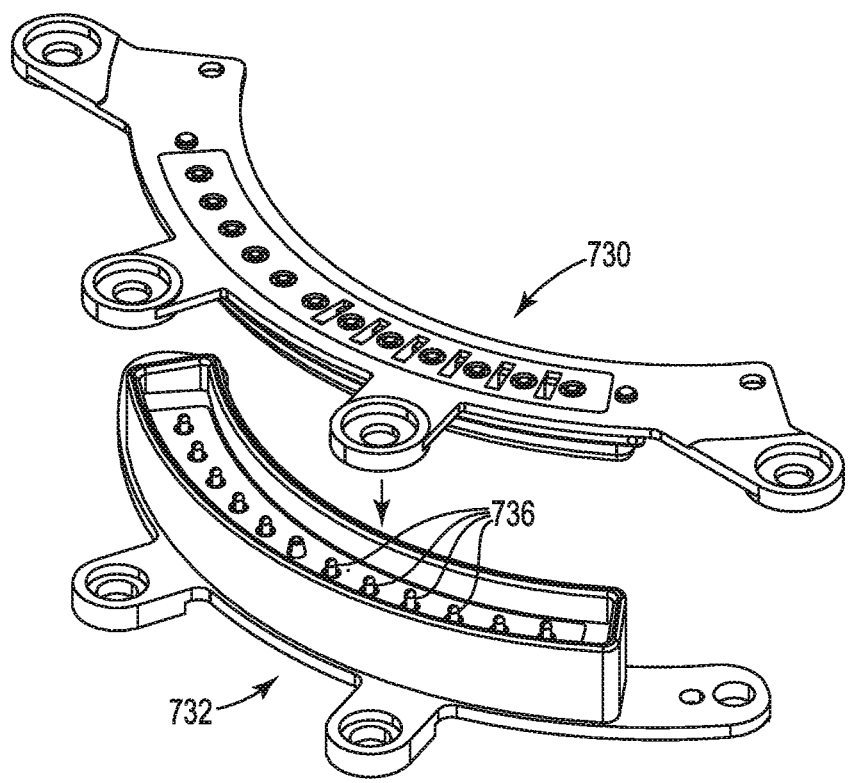
FIGS. 7A and 7B illustrate mating of the connector brackets of FIGS. 5 and 6 according to an example.
Figure 7B:
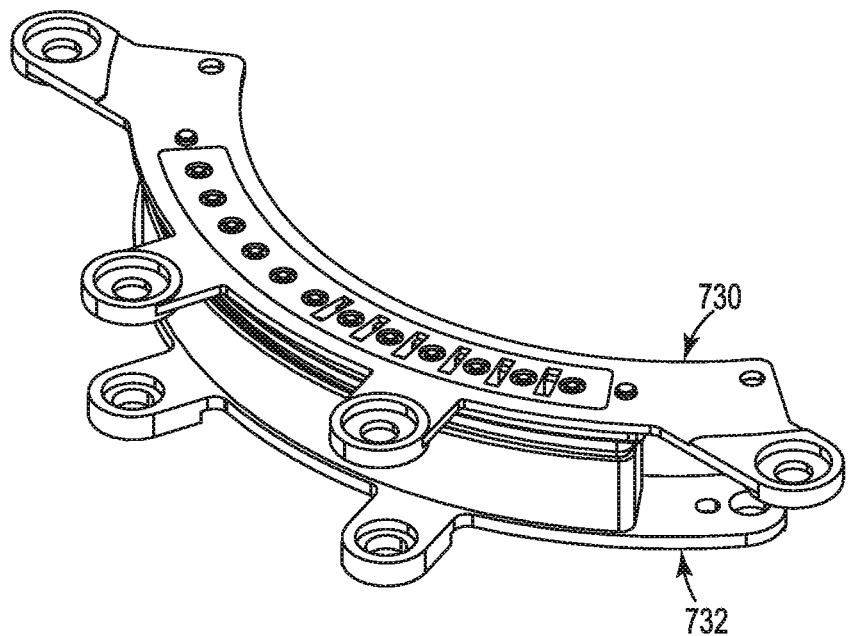

FIGS. 7A and 7B illustrate mating of the connector brackets 730 and 732 according to an example. During docking of the computing device to the mounting device, pogo pins 736 of connector bracket 732 advance within openings (not shown) of connector bracket 730. Once pogo pins 736 of connector bracket 732 are fully inserted within openings of connector bracket 730, engagement (docking) of the computing device and mounting device is achieved and a connection is formed between bracket connector 730 of the computing device and bracket connector 732 of the mounting device via pogo pins 736 so that signals may be transmitted between hub 110 and the computing device via the connection.

Figure 8A:
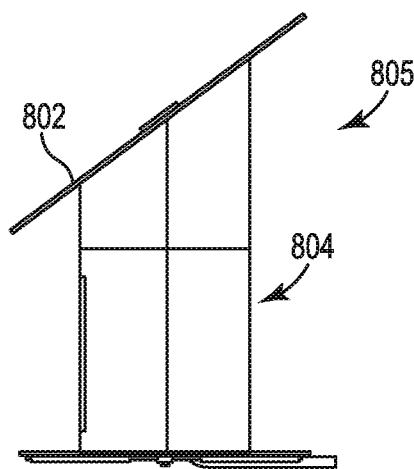
FIGS. 8A and 8B illustrate tilting of a computing device relative to a mounting device according to an example.
Figure 8B:
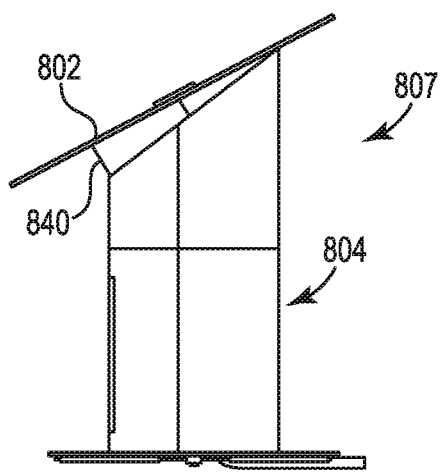

FIGS. 8A and 8B illustrate tilting of a computing device 802 positioned relative to a mounting device 804 according to an example. Computing device 802 and mounting device 804 may be analogous to either of computing device 102, 202, 302 and 402 and mounting device 104, 204, 304 and 404 described above. Once the computing device is positioned on the mounting device and the pogo pins are fully inserted within openings so that engagement (docking) of the computing device and the mounting device is achieved, computing device 802 may pulled by a user to be advanced between an insertion position 805 to a fully tilted position 807 so as to be positioned to be tilted away from mounting device 804, resulting in a gap 840 being formed between computing device 802 and mounting device 804. Over time, wear caused by repeated docking and advancing of the computing device by a user between the insertion position 805 and the fully tilted position 807 relative to mounting device 804 tends to result in the connection formed between one or more of the pogo pins and the openings to be reduced, resulting in corruption or loss of electrical connection between computing device 802 and mounting device 804.

Figure 9A:
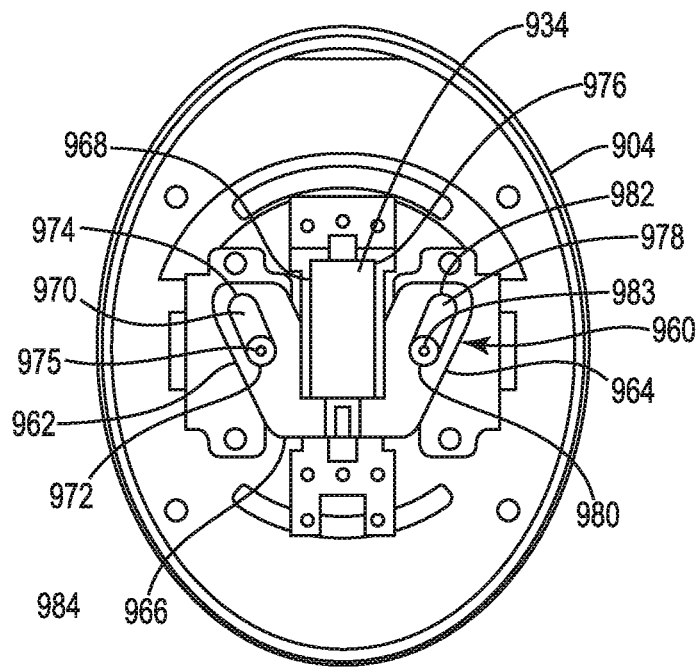
FIGS. 9A-C illustrate an adjustment control mechanism of a mounting device according to an example.
Figure 9B:
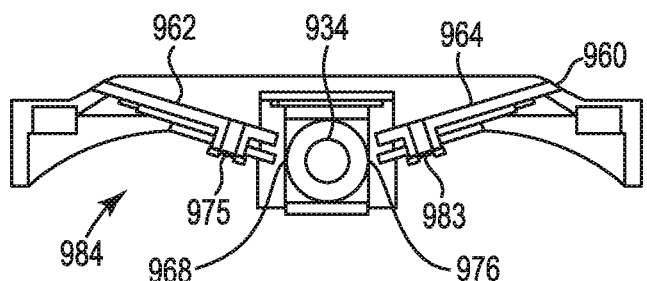
Figure 9C:
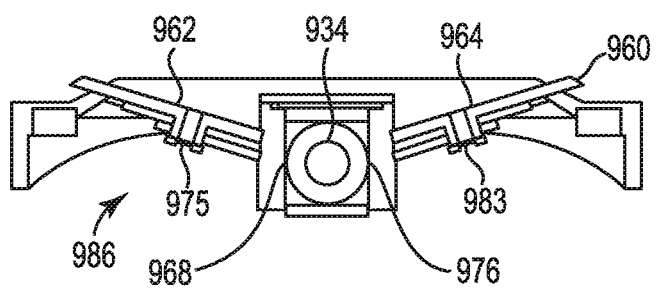

FIGS. 9A-C illustrate an adjustment control mechanism 960 of a mounting device 904 according to an example. Mounting device 904 may be analogous to any of mounting devices 104, 204, 304, 404 and 804 described above. In order to prevent degradation or loss of electrical connection between the computing device and the mounting device resulting from the repeated movement of the computing device relative to the mounting device by a user, at least one of pogo pins 934 of mounting device 904 includes adjustment control mechanism 960. FIG. 9A is a side view of at least one of pogo pins 934 and adjustment control mechanism 960. Adjustment control mechanism 960 includes a first arm 962 and a second arm 964 and a base portion 966 extending between first arm 962 and second arm 964. First arm 962 is positioned along a first side 968 of pogo pin 934 and can include an advancement channel 970 formed therein that extends from a first channel end 972 to a second channel end 974 and includes an advancement pin 975 positioned therein that is capable of slideably moving between first channel end 972 when the computing device is in the insertion position, and second channel end 974 when the computing device is in the full titled position.

Similarly, second arm 964 is positioned along a second side 976 of pogo pin 934 and includes an advancement channel 978 formed therein that extends from a first channel end 980 to a second channel end 982 and includes an advancement pin 983 that is capable of slideably moving between first channel end 980 when the computing device is in the insertion position and second channel end 982 when the computing device is in the fully tilted position.

FIG. 9B illustrates adjustment control mechanism 960 positioned in an insertion position 984 according to an example. FIG. 9B is a top view of the at least one pogo pin 934 and adjustment control mechanism 960. When in insertion position 984, the computing device is positioned on mounting device 904 and pogo pins are fully inserted within openings so that engagement (docking) of the computing device and mounting device 904 is achieved, advancement pin 975 is positioned at first channel end 972 of advancement channel 970 (shown in FIG. 9A) and advancement pin 983 is positioned at first channel end 980 of advancement channel 978 of adjustment control mechanism 960 (shown in FIG. 9A).

FIG. 9C illustrates adjustment control mechanism 960 positioned in the fully tilted position according to an example. FIG. 9C is a top view of the at least one pogo pin 934 and adjustment control mechanism 960. As a user tilts the computing device relative to the mounting device, advancement pins 975 and 983 advance along respective channels 970 and 978 from respective first channel ends 972 and 980 to corresponding second channel ends 974 and 982 (shown in FIG. 9A) so that once the advancement pins 975 and 983 are advanced to the fully tilted position, advancement pins 975 and 983 engage against second channel ends 974 and 982, preventing further advancement of pins 975 and 983 within channels 970 and 978. As a result, when adjustment control mechanism 960 is in fully tilted position 986 adjustment pins 975 and 983 prevent over advancement of the computing device by the user, thereby ensuring connection between the pogo pins of the mounting device and the corresponding openings of the computing device so that degradation or loss of electrical connection between the computing device and the mounting device no longer occurs.

Figure 10A:
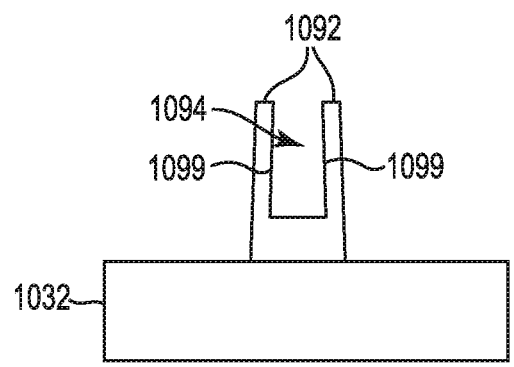
FIGS. 10A-D illustrate positioning of an electrical conductivity glue to electrically couple a pogo pin having an adjustment control mechanism according to an example.
Figure 10B:
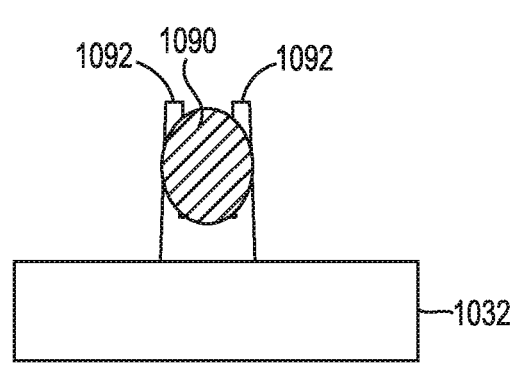
Figure 10C:
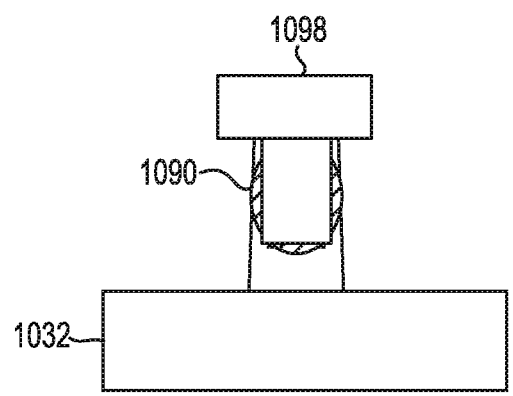
Figure 10D:
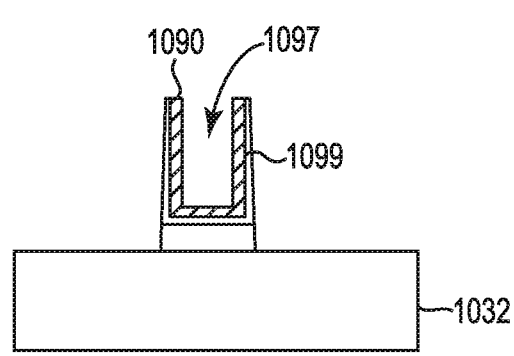

FIGS. 10A-D illustrate positioning of an electrical conductivity glue 1090 to electrically couple a pogo pin having an adjustment control mechanism according to an example. As illustrated in FIG. 10A, in order to position the pogo pins on the mounting device, connector bracket 1032 includes positioning arms 1092 that form cavities or openings 1094 in which each of the pogo pins are positioned in order to align the pogo pins in the connector bracket 1032 to enable an electrical connection of the pogo pins. As a result of the adjustment control mechanism being included on at least one of the pogo pins, electrical connection of the at least one pogo pin may no longer be maintained within a corresponding opening 1094 between positioning arms 1092 to maintain the desired electrical connection. Therefore, conductivity glue 1090 can be positioned, as illustrated in FIG. 10B, within opening 1094 of positioning arms 1092. As illustrated in FIG. 10O, a forming pin 1098 can be inserted within opening 1094, thereby forming the electrical conductivity glue along walls 1099. The forming pin 1098 can be removed, leaving the conductivity glue 1090 formed along the walls 1099, forming opening 1097, as illustrated in FIG. 10D. Therefore, when a pin is inserted into the opening 1097, the pin can be maintained within the opening 1097 and the electrical connection can be maintained as well, regardless of repeated removal and insertion of the pin into the opening 1097. As a result, electrically connectivity of the at least one pogo pin is maintained.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. An apparatus, comprising:
   a mounting device;
   a connector bracket fixedly positioned on the mounting device;
   a plurality of pogo pins positioned within the connector bracket; and
   an adjustment control mechanism positioned about at least one pogo pin of the plurality of pogo pins, the adjustment control mechanism to maintain electrical connection of the plurality of pogo pins, wherein the adjustment control mechanism comprises:
      a first arm positioned along a first side of the at least one pogo pin and having a first advancement channel formed therein, the first advancement channel extending between a first end and a second end;
      a first advancement pin positioned within the first advancement channel and configure to slideably advance between the first end of the first advancement channel and the second end of the first advancement channel
      a second arm positioned along a second side of the at least one pogo pin and having a second advancement channel formed therein, the second advancement channel extending between a first end and a second end; and
      a second advancement pin positioned within the second advancement channel and configure to slideably advance between the first end of the second advancement channel and the second end of the second advancement channel.

2. The apparatus of claim 1, wherein the adjustment control mechanism advances between an insertion position and a fully tilted position,
   the first advancement pin being positioned at the first end of the first advancement channel and the second advancement pin being positioned at the first end of the second advancement channel in the insertion position, and
   the first advancement pin being positioned at the second end of the first advancement channel and the second advancement pin being positioned at the second end of the second advancement channel in the fully tilted position.

3. The apparatus of claim 1, further comprising:
   positioning arms comprising walls forming an opening for receiving the at least one pogo pin; and
   electrical conductivity glue formed along the walls to electrically connect the at least one pogo pin.

4. An apparatus, comprising:
   a first connector bracket;
   a plurality of pogo pins positioned within the first connector bracket;
   a second connector bracket forming a plurality of openings for receiving the plurality of pogo pins to form an electrical connection; and
   an adjustment control mechanism positioned about at least one pogo pin of the plurality of pogo pins, the adjustment control mechanism to fixedly position the plurality of pogo pins within the plurality of openings to maintain electrical connection of the first connector bracket and the second connector bracket, wherein the adjustment control mechanism comprises:
      a first arm positioned along a first side of the at least one pogo pin and having a first advancement channel formed therein, the first advancement channel extending between a first end and a second end;
      a first advancement pin positioned within the first advancement channel and configure to slideably advance between the first end of the first advancement channel and the second end of the first advancement channel
      a second arm positioned along a second side of the at least one pogo pin and having a second advancement channel formed therein, the second advancement channel extending between a first end and a second end; and
      a second advancement pin positioned within the second advancement channel and configure to slideably advance between the first end of the second advancement channel and the second end of the second advancement channel.

5. The apparatus of claim 4, wherein the adjustment control mechanism advances between an insertion position and a fully tilted position,
   the first advancement pin being positioned at the first end of the first advancement channel and the second advancement pin being positioned at the first end of the second advancement channel in the insertion position, and
   the first advancement pin being positioned at the second end of the first advancement channel and the second advancement pin being positioned at the second end of the second advancement channel in the fully tilted position.

6. The apparatus of claim 4, further comprising:
   positioning arms comprising walls forming an opening for receiving the at least one pogo pin; and electrical conductivity glue formed along the walls to electrically connect the at least one pogo pin.

7. A system, comprising:
a mounting device comprising:
- a first connector bracket fixedly positioned on the mounting device;
- a plurality of pogo pins positioned within the first connector bracket; and
- an adjustment control mechanism positioned about at least one pogo pin of the plurality of pogo pins; and a computing device comprising a second connector bracket fixedly positioned on the computing device, the second connector bracket forming a plurality of openings for receiving the plurality of pogo pins, wherein the adjustment control mechanism is to fixedly position the plurality of pogo pins within the plurality of openings to maintain electrical connection of the first connector bracket and the second connector bracket during adjustment of the computing device relative to the mounting device, and wherein the adjustment control mechanism comprises:
- a first arm positioned along a first side of the at least one pogo pin and having a first advancement channel formed therein, the first advancement channel extending between a first end and a second end;
- a first advancement pin positioned within the first advancement channel and configure to slideably advance between the first end of the first advancement channel and the second end of the first advancement channel;
- a second arm positioned along a second side of the at least one pogo pin and having a second advancement channel formed therein, the second advancement channel extending between a first end and a second end; and
- a second advancement pin positioned within the second advancement channel and configure to slideably advance between the first end of the second advancement channel and the second end of the second advancement channel.

8. The system of claim 7, wherein the adjustment control mechanism advances between an insertion position,
- the plurality of pogo pins are advanced to be inserted with the plurality of openings as the computing device is positioned on the mounting device and in a fully tilted position,
- the computing device is tilted away from the mounting device forming a gap between the computing device and the mounting device,
- the first advancement pin being positioned at the first end of the first advancement channel and the second advancement pin being positioned at the first end of the second advancement channel in the insertion position, and
- the first advancement pin being positioned at the second end of the first advancement channel and the second advancement pin being positioned at the second end of the second advancement channel in the fully tilted position to prevent over advancement of the computing device relative to the mounting device.

9. The system of claim 8, further comprising:
positioning arms comprising walls forming an opening for receiving the at least one pogo pin; and
electrical conductivity glue formed along the walls to electrically connect the at least one pogo pin.

* * * * *